Figure 1:
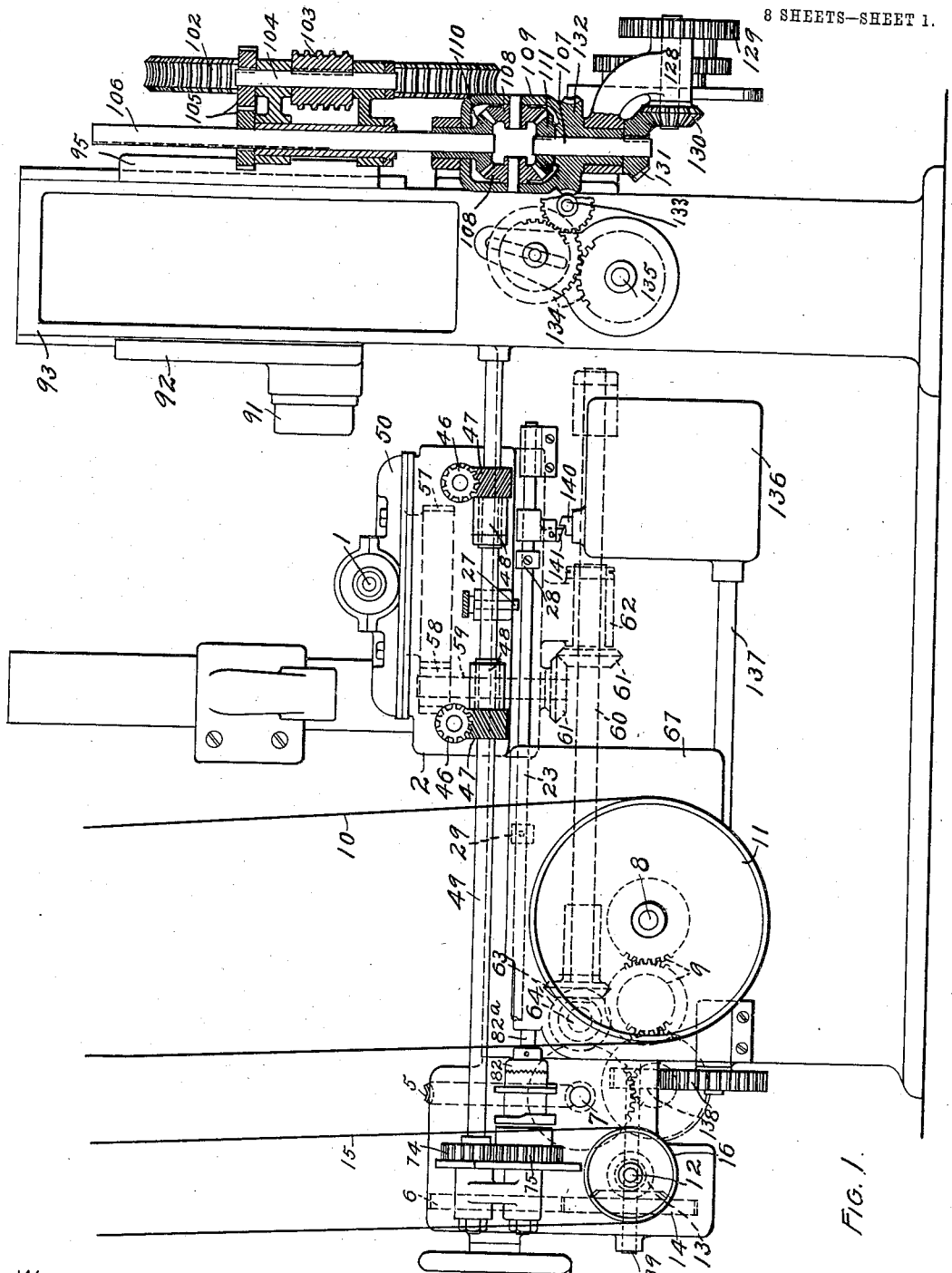

No. 842,989. PATENTED FEB. 5, 1907.
R. T. WINGO.
SPIRAL CUTTING MACHINE.
APPLICATION FILED JAN. 16, 1904.

8 SHEETS—SHEET 3.

WITNESSES
James H. Thurston
Catherine G. Bradley.

INVENTOR
Richard T. Wingo,
by Wilmarth H. Thurston
ATT'Y

No. 842,989. PATENTED FEB. 5, 1907.
R. T. WINGO.
SPIRAL CUTTING MACHINE.
APPLICATION FILED JAN. 16, 1904.

8 SHEETS—SHEET 4.

WITNESSES
James H. Thurston
Catherine G. Bradley.

INVENTOR
Richard T. Wingo,
by Wilmarth H. Thurston,
ATT'Y.

No. 842,989. PATENTED FEB. 5, 1907.
R. T. WINGO.
SPIRAL CUTTING MACHINE.
APPLICATION FILED JAN. 16, 1904.
8 SHEETS—SHEET 5.
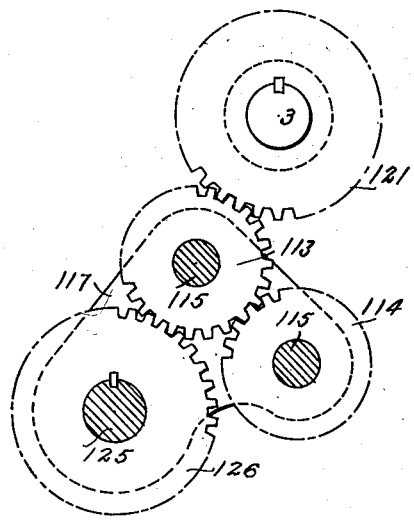
FIG. 12
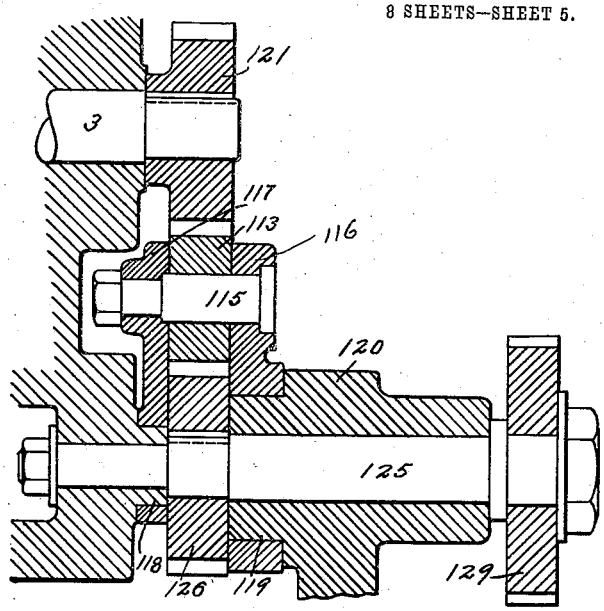
FIG. 11
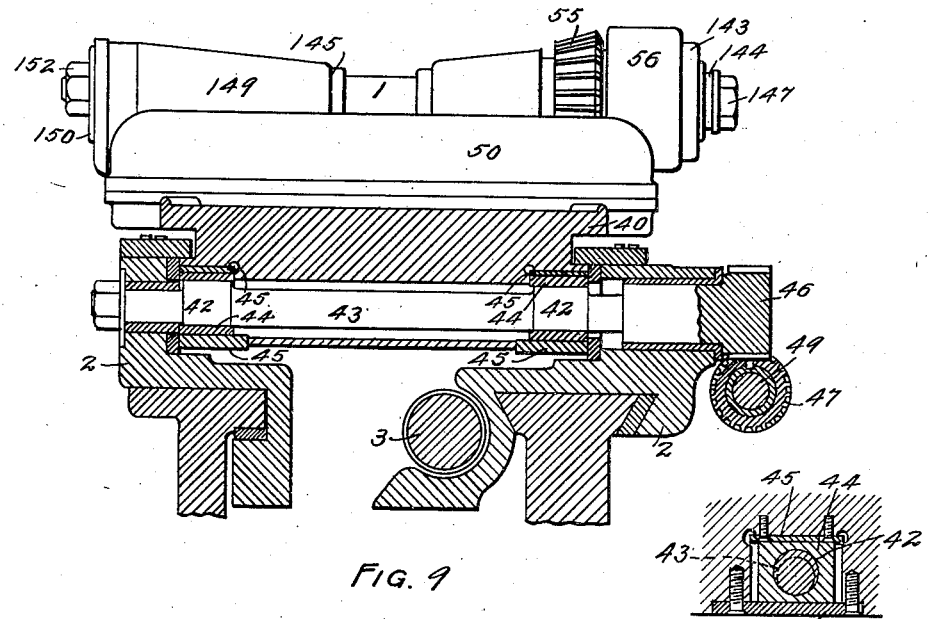
FIG. 9
FIG. 10
WITNESSES
James H. Thurston
Catherine G. Bradley.
INVENTOR
Richard T. Wingo,
by Wilmarth H. Thurston
ATT'Y No. 842,989. PATENTED FEB. 5, 1907.
R. T. WINGO.
SPIRAL CUTTING MACHINE.
APPLICATION FILED JAN. 16, 1904.

8 SHEETS—SHEET 7.

WITNESSES
James H. Thurston
Catherine G. Bradley

INVENTOR
Richard T. Wingo,
by Wilmarth H. Thurston
ATT'Y

No. 842,989. PATENTED FEB. 5, 1907.
R. T. WINGO.
SPIRAL CUTTING MACHINE.
APPLICATION FILED JAN. 16, 1904.

8 SHEETS—SHEET 8.

WITNESSES,
James H. Thurston
Catherine G. Bradley

INVENTOR,
Richard T. Wingo,
BY Wilmarth H. Thurston,
ATT'Y.

UNITED STATES PATENT OFFICE.

RICHARD T. WINGO, OF PROVIDENCE, RHODE ISLAND, ASSIGNOR TO BROWN AND SHARPE MANUFACTURING COMPANY, OF PROVIDENCE, RHODE ISLAND, A CORPORATION OF RHODE ISLAND.

SPIRAL-CUTTING MACHINE.

No. 842,989. Specification of Letters Patent. Patented Feb. 5, 1907.

Application filed January 16, 1904. Serial No. 189,319.

*To all whom it may concern:*

Be it known that I, RICHARD T. WINGO, of Providence, in the county of Providence and State of Rhode Island, have invented certain new and useful Improvements in Spiral-Cutting Machines; and I do hereby declare the following specification, taken in connection with the accompanying drawings, forming a part of the same, to be a full, clear, and exact description thereof.

The invention relates more especially to machines for cutting spirals in which the work is carried by a rotary blank-support and is acted upon by a rotary cutter the axis of which is at an angle to the axis of the blank-support and in which either the cutter or the blank is reciprocated parallel to the axis of the blank. In such machines the cutter should be out of cutting relation during the return movement of the reciprocating support, and this may be provided for by moving either the cutter or the work.

It has heretofore been customary to throw the blank and cutter out of cutting relation by a swinging movement of either the cutter or blank support. The clearing movement with such construction is in the arc of a circle with a constant liability that the cutter may contact with the wall of the cut as the blank and cutter are thrown out of cutting relation, and the danger of such action increases as the angle between the axes of the blank and cutter increases. This objectionable feature in the prior constructions is eliminated by certain features of the present invention which provide for a relative movement between the cutter and blank at right angles to the axes of the blank and cutter in clearing the cutter from the blank—that is to say, if the axes of the blank and cutter are arranged horizontally, as is customary, the blank and cutter are thrown out of cutting relation by a direct vertical movement either of the blank or cutter, and thus all danger of injury to the work by the cutter in clearing the work is eliminated.

It is preferred to move the cutter at right angles to the axes of the blank and cutter in throwing the blank and cutter out of cutting relation rather than to move the blank, and certain further features of invention relate to the construction and arrangement which provides for such movements of the cutter. In this class of machines the blank and cutter should be in cutting relation whenever the movement of the reciprocating support is forward or in the direction of the cutting movement and should be out of cutting relation whenever the movement of such support is in the direction of the return or non-cutting movement. To insure this, the mechanism for throwing the blank and cutter into and out of cutting relation is so controlled by the device for alternately connecting the reciprocating support with the feed mechanism and the return mechanism that the operation of such device in connecting either mechanism with the support to reverse its previous movement results in the operation of the mechanism for throwing the blank and cutter into and out of cutting relation. This is another of the features of invention.

Another feature of invention relates to the means for operating the mechanism for throwing the blank and cutter out of cutting relation which insures the proper timing of such mechanism under all conditions. This mechanism is driven by a clutch which is intermittently thrown into and out of operation by the coöperation of rotary and non-rotary members, the rotary member or members, as the case may be, being carried by the clutch and the non-rotary member or members being movable into and out of the path of the rotary member or members and the members being so arranged and operated that in disengaging a non-rotary member from a rotary member to throw the clutch into operation a non-rotary member is moved into the path of a rotary member. Thus the operation of the devices for throwing the clutch into operation sets devices for throwing it out, so that there is no danger of failure to throw out at the proper time or of operating improperly.

Further features of invention relate to the construction of the mechanism for throwing the blank and cutter out of cutting relation and locking it in position between operations. Further features of invention relate to the means for securing the blank-support rigidly in position, to the manner of mounting and driving the cutter-spindle, and to various further features and combinations which will be pointed out in the claims The various features of invention have been embodied in a machine in which the cutter-support is the reciprocating support and in which the blank and cutter are thrown out of and into cutting relation by movement of the cutter, and certain of the features of invention relate more particularly to this type of machine.

Other features are of more general application, however, and, as already indicated, may be embodied in different forms of machines.

The various features of the invention will be best understood from the following detailed description of the machine shown in the drawings, which illustrates one embodiment of such features.

Figure 2:
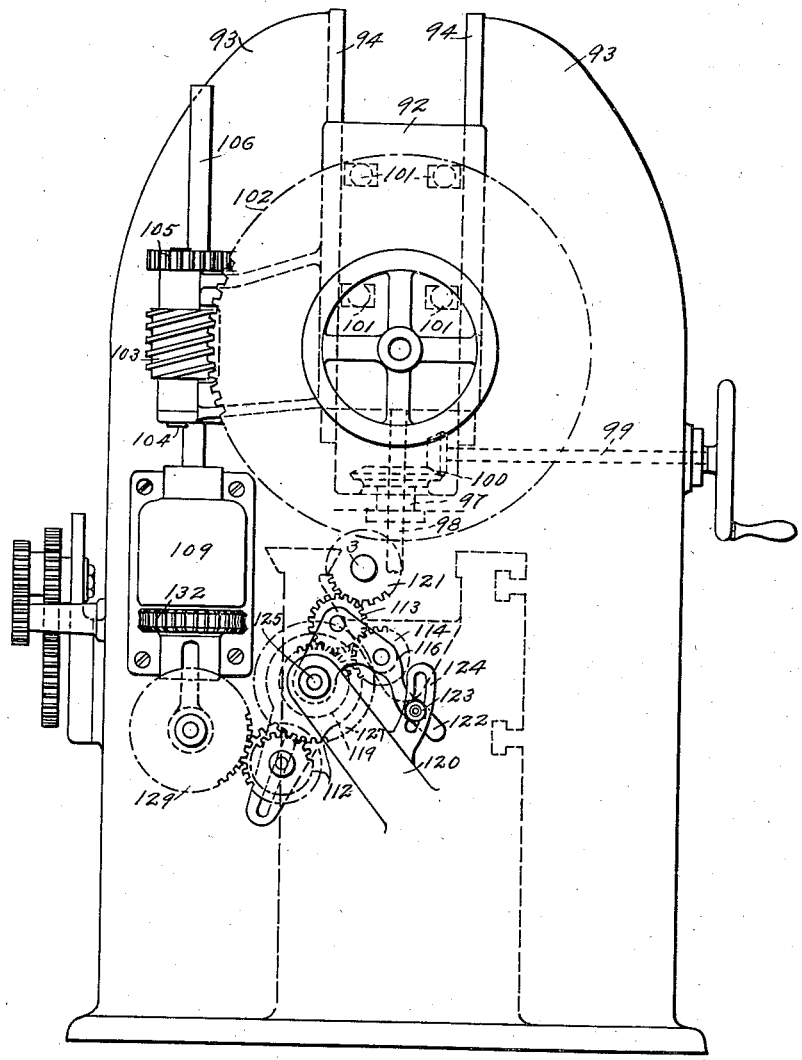
Figure 3:
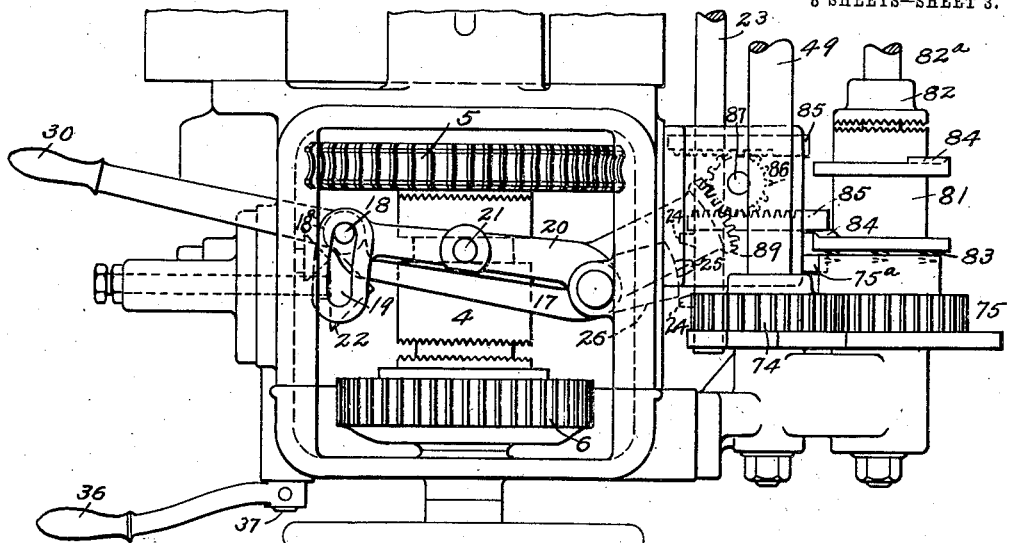
Figure 6:
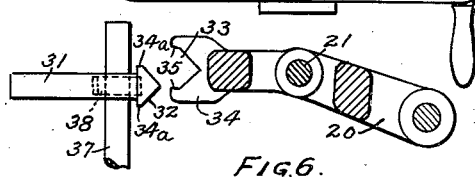
Figure 4:
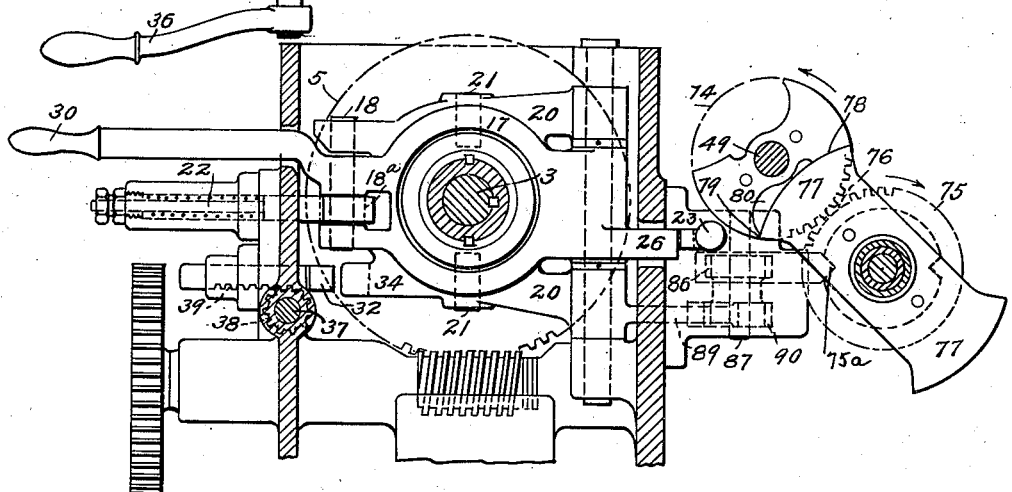
Figure 5:
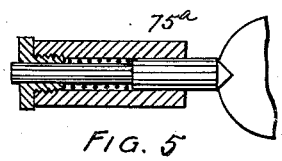
Figure 7:
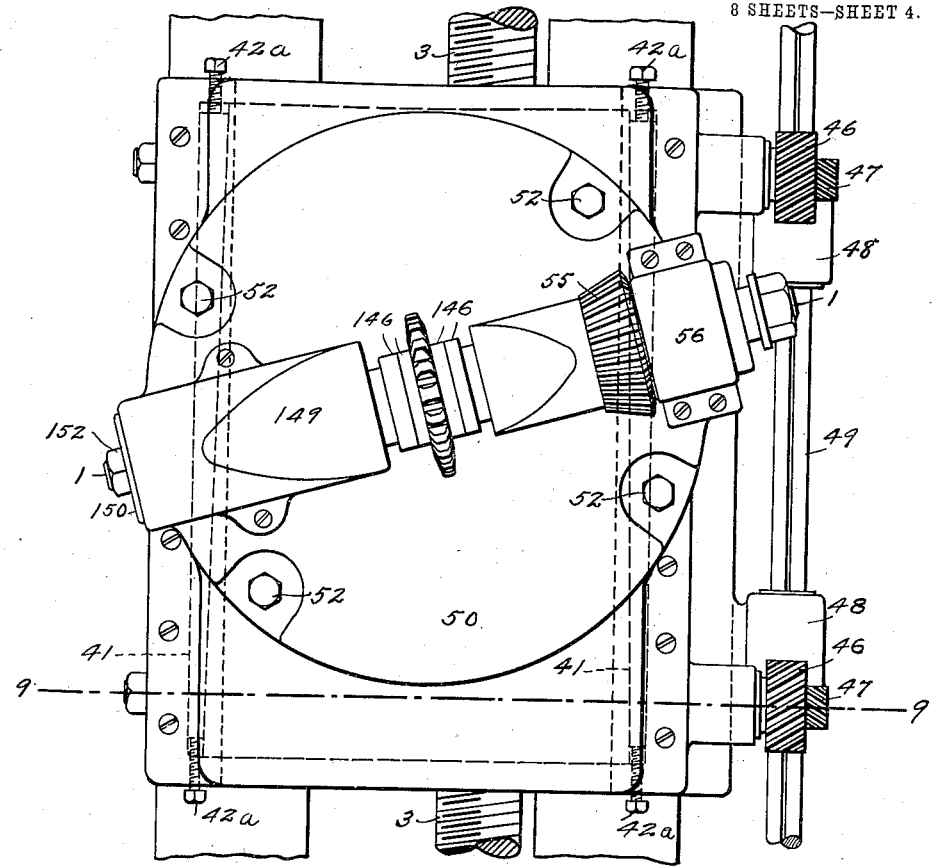
Figure 8:
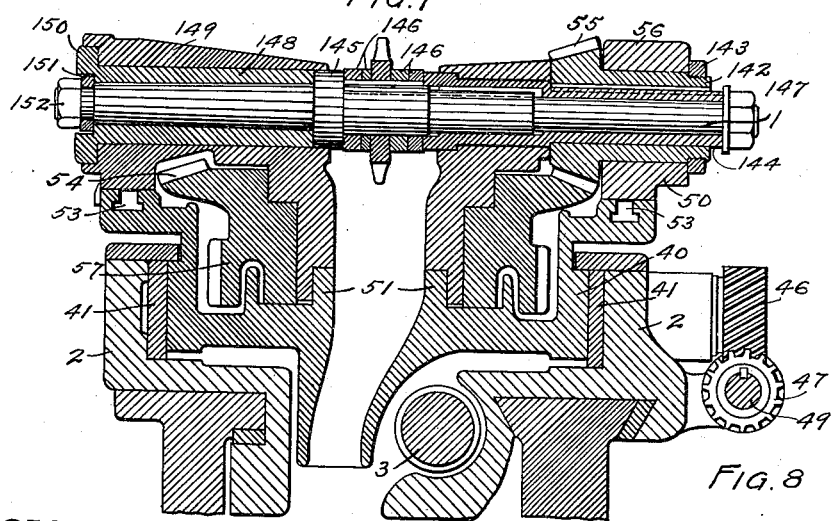
Figure 13:
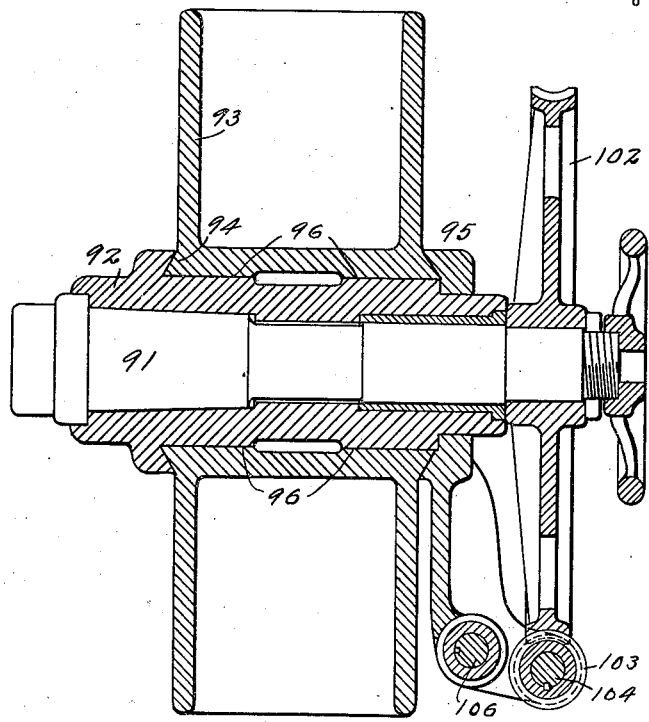
Figure 14:
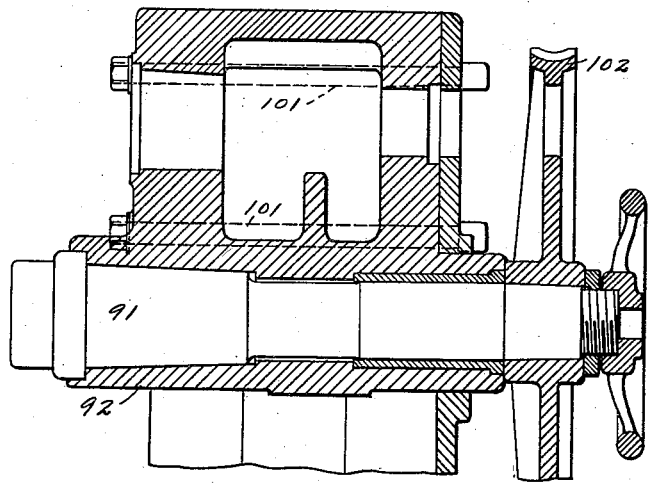
Figure 15:
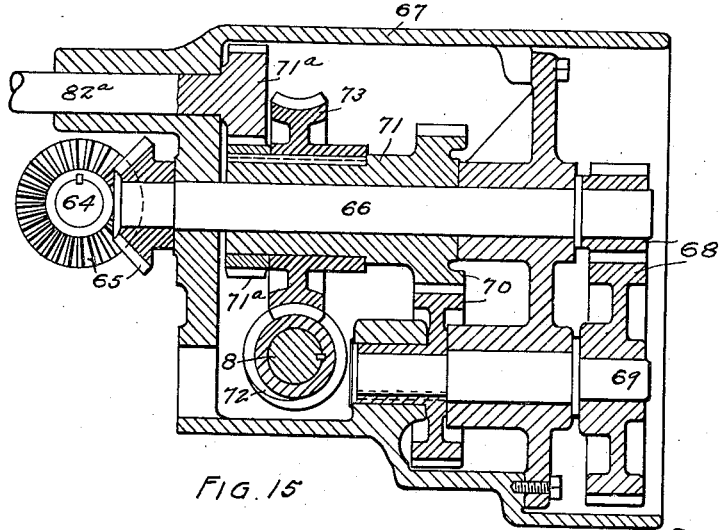
Figure 16:
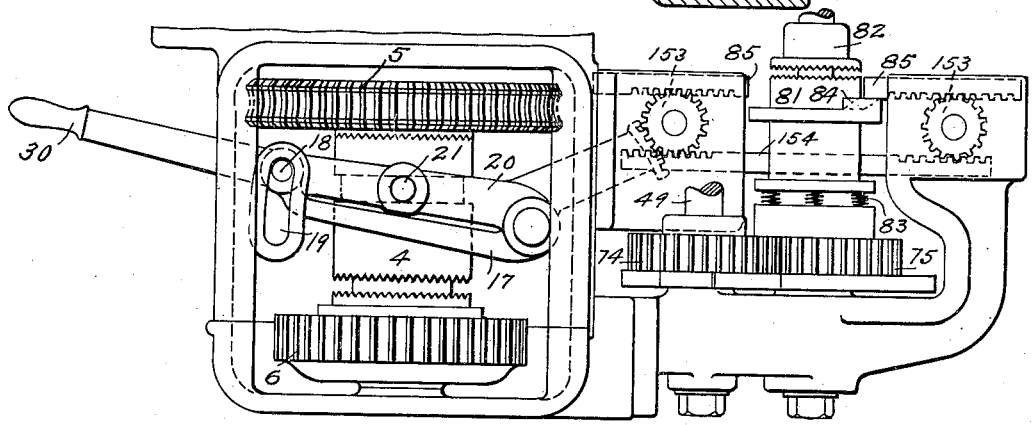
Figure 17:
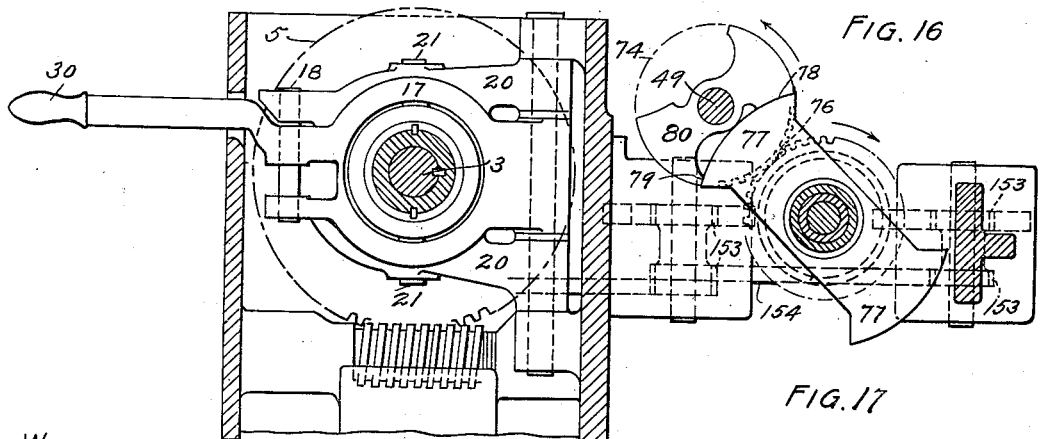
Figure 18:
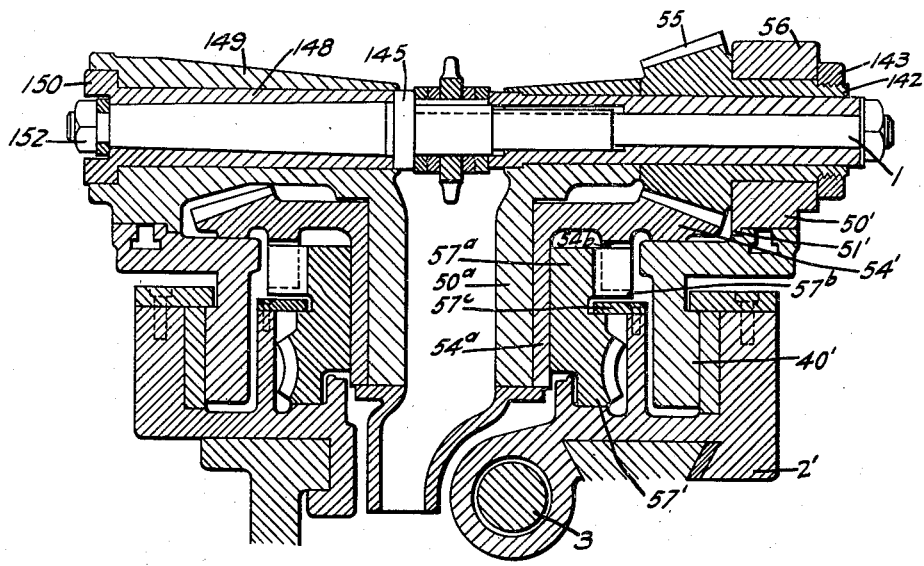
Figure 19:
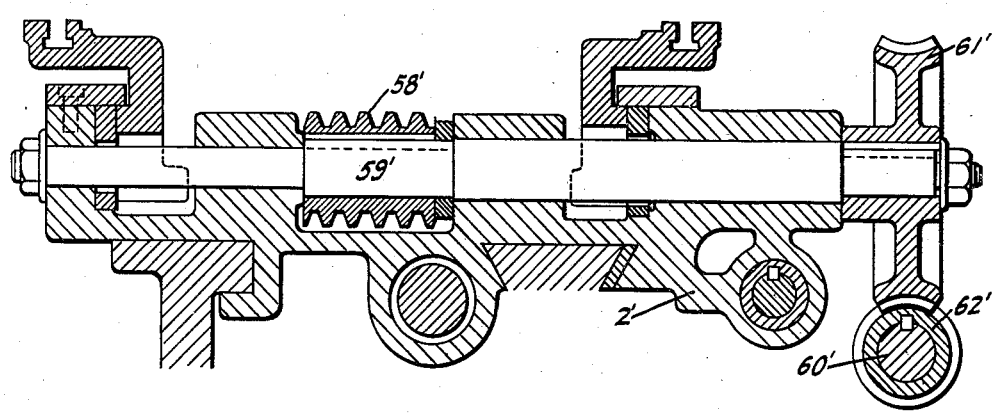

In the drawings, Figure 1 is a rear elevation of the machine. Fig. 2 is an end view looking toward the left in Fig. 1. Figs. 3 and 4 are details showing the devices for shifting the reversing-clutch and the devices for operating the mechanism for throwing the cutter into and out of cutting relation. Figs. 5 and 6 are details of the parts shown in Figs. 3 and 4. Fig. 7 is an enlarged plan view of the cutter-slide. Fig. 8 is a vertical section through the axis of the cutter-spindle when said spindle is arranged at right angles to the movement of the cutter-slide. Fig. 9 is a vertical section on line 9 9, Fig. 7. Fig. 10 is a detail of parts shown in Fig. 9. Figs. 11 and 12 are details showing the gearing for reversing the direction of the rotation of the work-spindle. Fig. 13 is a horizontal section through the axis of the work-spindle. Fig. 14 is a vertical section through said axis. Fig. 15 is a vertical section showing certain gearing for operating the mechanism which throws the cutter into and out of cutting relation and for driving the cutter-spindle. Figs. 16 and 17 are details corresponding to Figs. 3 and 4, showing a modified form of mechanism. Fig. 18 is a view similar to Fig. 8, showing a modified form of cutter-drive. Fig. 19 is a sectional view through the worm-shaft which forms a part of this drive.

In the machine shown in the drawings the cutter-spindle 1 is carried in a cutter-slide 2, mounted upon horizontal ways formed on the frame of the machine. The cutter-slide is moved on the ways by a feed-screw 3, arranged parallel to the ways and carrying a clutch 4, Fig. 3, which is connected to turn with the screw and is arranged between two oppositely-rotating gears 5 and 6. The gear 5 is driven at a slow speed, and when the clutch 4 is engaged with this gear the feed-screw is turned in a direction to feed the cutter-slide slowly forward during the cutting operation. The gear 6 is driven at a comparatively high speed in the opposite direction, and when the clutch 4 is engaged with this gear the feed-screw is turned to quickly return the cutter-slide to its retracted position ready for the next cut.

The feeding-gear 5 is a worm-wheel and is driven by a worm secured on a transverse shaft 7, Fig. 1, which is connected with a driving-shaft 8 by a system of change-gears 9, arranged on the front side of the frame. The driving-shaft 8 is continuously driven by a belt 10, passing over a pulley 11 on the rear side of the machine. The return-gear 6 is driven from a second driving-shaft 12 through bevel-gears 13 and a spur-gear 14, which engages gear 6. The driving-shaft 12 is driven at a high speed by a belt 15, passing over a pulley 16, arranged on the rear side of the machine, as shown in Fig. 1.

It is desirable that the clutch 4 be shifted from one gear to the other in reversing the movement of the cutter-slide by a sudden movement. In case the clutch is a positive clutch provided with engaging clutch-teeth the clutch should be forced into engagement with the clutch members on the gears by a spring in order that the clutch may be properly engaged and without landing of the teeth. This manner of shifting the clutch is provided for by employing an operating device having a limited movement independent of the clutch in connection with a spring device for completing the clutch-shifting movement of the operating device after it has finished its independent movement. In the machine shown this operating device consists of a lever 17, Figs. 3 and 4, pivoted at one side of the clutch and provided with a pin 18, arranged to play in a slot 19, formed in the end of a second lever 20, which is connected with the clutch 4 by means of pins 21 engaging an annular groove in the clutch. The ends of the slot 19 form shoulders for connecting the levers 17 and 20 and allowing a limited play between the levers. When the lever 17 is operated to shift the clutch 4, its movement is not imparted to the lever 20 until the play between the pin 18 and the end of the slot 19 has been taken up. During this part of the movement of the lever 17 a roller 18$^a$, mounted thereon, acts against one side of the V-shaped end of a spring-pressed plunger 22, forcing the plunger back against the tension of its spring. About the time that the pin 18 reaches the end of the slot 19 the roller 18$^a$ passes the end of the V, so that the opposite side of the V acts against the roller to suddenly complete the movement of the lever 17. During this part of the movement of the lever 17 the lever 20, and consequently the clutch 4, moves with it, thereby suddenly shifting the clutch from one gear to the other.

The initial movement is imparted to the lever 17 to take up the lost motion or play between this lever and the lever 20 by a reversing-bar 23, Figs. 1 and 3, provided with lugs 24, arranged to engage the opposite sides of a lug 25, formed on the rearwardly-projecting arm 26 of the lever 17. The reversing-bar is operated by the cutter-slide. As the cutter-slide reaches the limit of its forward movement a pin 27, carried by the slide, engages a collar 28 on the bar 23, thereby moving the bar 23, so that the rear lug 24 acts against the lug 25 and moves the lever 17 until the roller 21 has passed the end of the V on the plunger 22. The clutch is then shifted, as above described, into engagement with the gear 6 and the movement of the cutter-slide reversed. On the return stroke of the cutter-slide the pin 27 acts against the collar 29 on the bar 23, moving the other lug 24 against the lug 25 and shifting the lever 17 in the opposite direction. The clutch 4 may be shifted manually to reverse the movement of the cutter-slide by means of a handle 30, formed on the end of the lever 17, Figs. 3 and 4.

It is frequently desirable during the running of the machine or in setting up the machine for a piece of work to disconnect the cutter-slide from both the feed and return mechanism, and this may be done by moving the clutch 4 into mid-position between the gears 5 and 6 and holding it in this position until the automatic reciprocation of the cutter-slide is to be begun or resumed. The device for thus moving and holding the clutch 4 consists of a bar 31, provided with a V-shaped end 32, arranged to enter a V-shaped recess 33, formed in a projecting lug 34 on the lever 20. When the clutch 4 is in engagement with the gear 5, the recess 33 is in the position with relation to the bar 31 indicated in Fig. 6. If the bar 31 is advanced when the parts are in this position, one side of the V on the bar 31 will engage the side of the recess 33 and will act as a cam to move the lever 20 until the head 32 of the bar registers with the recess in the lug 34. This movement of the lever 20 will shift the clutch 4 into mid-position and the clutch will be locked in this position by the engagement of the straight sides 34$^a$ on the head of the bar 31 with tht straight sides 35 of the recess in the lug 34. If the clutch 4 is in engagement with the gear 6 when the bar 31 is advanced, then the opposite side of the V on the bar will act against the opposite side of the recess in the lug 34 to shift the lever 20 and the clutch 4 into mid-position. When the bar 31 is withdrawn, the clutch will be reëngaged with the gear from which it was disengaged by the advance movement of the bar by the action of the spring-pressed plunger 22 on the roller 18$^a$. The bar 31 may be advanced and retracted by means of the lever 36, secured to the end of a rock-shaft 37, which is provided with a pinion 38, engaging rack-teeth 39 on the bar.

In this machine the cutter-spindle and the work-supporting spindle are engaged horizontally and the blank and cutter are thrown into and out of cutting relation by a direct vertical movement of the cutter. In order that the cutter-spindle may be given this vertical movement, the spindle is supported on a cutter-carriage 40, Figs. 7, 8, and 9, mounted in vertical guides formed in the cutter-slide. The cutter-carriage is guided between tapered gibs 41, which may be adjusted by means of screws 42$^a$ to take up any wear and to keep the cutter centered. The devices for moving the cutter-carriage to move the cutter into and out of cutting relation consists of eccentrics 42, formed on shafts 43, mounted in the cutter-slide. There are four of these eccentrics, one at each corner of the cutter-carriage, and they are connected with the cutter-carriage by the eccentric-blocks 44, held between guiding-plates 45, secured to the cutter-carriage, Fig. 10. The shafts 43 extend transversely to the cutter-slide and are provided at their outer ends with spiral gears 46, engaging similar spiral gears 47, mounted in bearings 48 on the side of the cutter-slide. The gears 47 are connected with a shaft 49, so that they turn with said shaft, while being free to slide thereon as the cutter-slide moves back and forth. The shaft 49 is given a half-turn at the end of the forward movement of the cutter-slide to lower the cutter out of cutting relation and is given a half-turn at the end of the return movement of the cutter-slide to raise the cutter into cutting relation.

In order that the cutter may be set at varying angles, according to the work to be performed, the cutter-spindle is mounted in a swivel-head 50, mounted to turn about a post 51, formed on the cutter-carriage. The head 50 is secured in adjusted position by bolts 52, the heads of which engage an annular T-groove 53, formed in the cutter-carriage.

In order that the adjustments of the cutter-spindle for varying the angle of the cutter may not affect the connections between the cutter-spindle and its driving mechanism, the spindle is driven through a gear 54, concentric with the axis about which the head 50 is adjusted. This gear, as shown, is a bevel-gear and is connected with the spindle by a bevel-gear 55, mounted in a bearing 56 on the head 50 and engaging the gear 54. The gear 54 is rotated through a driven gear 57, connected therewith and driven from a pinion 58, secured to a shaft 59, mounted in the cutter-slide. The gears 54 and 57 are connected together by being formed integral with each other, and in the machine shown the gear 57 is a spur-gear driven through a spur-pinion 58. This is one form of gearing the parts of which may be mounted on the cutter-slide and cutter-carriage, respectively, and permit of the vertical movement of the cutter-carriage in throwing the cutter into and out of cutting relation without interfering with the proper driving of the cutter. By driving the gear 54 through this spur-gearing or other forms of gearing which allow a direct vertical movement of the cutter-carriage in moving the cutter in and out of cutting relation the necessity for any jointed and extensible connections between the gearing on the cutter-slide and the fixed members of the driving mechanism is eliminated. The elimination of such jointed connections enables a more simple and efficient mechanism to be employed for continuously driving the cutter-spindle during the reciprocation of the cutter-slide than is practicable in machines in which the cutter is thrown into and out of cutting relation by a swinging movement. The shaft 59 is driven to continuously rotate the cutter from a shaft 60, mounted in fixed bearings and extending parallel to the movement of the cutter-slide. These shafts are connected by bevel-gears 61, one of which is secured to the shaft 59 and the other of which is mounted in a bearing 62, depending from the cutter-slide, and is connected to turn with the shaft 60, while being free to slide thereon as the cutter-slide moves back and forth. The mechanism for driving the shaft 60 from the driving-shaft 8 is shown in Figs. 1 and 15 and is as follows:
The shaft 60 is connected by bevel-gears 63 with a transverse shaft 64, which is in turn connected by bevel-gears 65, Fig. 15, with a shaft 66, mounted in the gear-case 67, secured to the rear side of the machine. The shaft 66 is connected, through gears 68, with a short shaft 69, which is in turn connected, through gears 70, with a sleeve 71, loosely mounted on the shaft 66. The sleeve 71 is driven from the driving-shaft 8 through a worm 72, secured to the shaft 8 and engaging a worm-wheel 73, keyed to the sleeve 71.

As has been stated, the shaft 49, which is geared to the shafts 43, which carry the eccentrics for moving the cutter-carriage into and out of cutting relation, is given a half-revolution whenever the cutter is to be thrown into or out of cutting relation. The mechanism for thus operating the shaft 49 is shown in Figs. 3 and 4 and is as follows:
A gear 74 is secured to the shaft 49 and is driven by a driving-gear 75, provided with two diametrically opposite blank spaces 76 where a number of teeth have been removed. The gear 75 is so proportioned that it makes the same number of revolutions as the gear 74 and is intermittently rotated through a half-revolution whenever the cutter is to be thrown into or out of cutting relation. When one of the blank spaces 76 is opposite the teeth of the gear 74, the shaft 49 is at rest and the cutter-carriage is either in its raised or lowered position. The cutter-carriage should remain in this position until the shaft 49 is given another half-turn, and the shaft 49 is locked in the position into which it is turned by the gear 75 to prevent any movement of the cutter-carriage until the gear 75 is again turned through a half-revolution. The means for thus locking the shaft 49 consists of locking-segments 77, connected to revolve with the gear 75, and locking-shoes 78 and 79, connected to revolve with the gear 74 and to coöperate with the locking-segments 77. There is a clearance-space 80 between the locking-shoes 78 and 79, so that the gear 74 may begin its revolution as soon as the locking-segment 77 has turned sufficiently to clear the rear locking-shoe 79. This construction of locking-segment and locking-shoes firmly locks the shaft 49 in the position into which it is turned by the gear 75, and by reason of the clearance-space 80 very little lost motion between the gear 75 and gear 74 is required to effect the unlocking of the shaft 49. Consequently only one or two teeth need be removed from the gear 75 in forming the blank space 76, and only a slight movement of the gear 75 brings the teeth of this gear into mesh with the teeth of the gear 74. The shaft 49 is by this mechanism always under the positive control of either the gear 75 or the locking-segments and shoes, and there is no possibility, therefore, of the shaft 49 getting out of time with the gear 75.

The gear 75 is intermittently rotated through a half-revolution by a clutch 81, connected to rotate with the gear. This clutch is forced toward a constantly-rotating clutch member 82 by springs 83, interposed between the clutch and the hub of the gear 75. The clutch is held out of engagement with the clutch member 82 against the tension of the springs 83 by the coöperation of cams 84, carried with the clutch and abutments 85, movable into and out of the path of the cams. The cams 84 are arranged on diametrically opposite sides of the clutch, and the abutments 85 are in the form of plungers arranged to slide into and out of the path of the cams 84. The plungers 85 are so connected or operated that one of them moves into the path of a cam 84 as the other is disengaged from the other cam 84. There is consequently always an abutment in the path of a cam, ready to throw the clutch 81 out of engagement with the clutch member 82, and there is no possibility, therefore, that the clutch may make more than a half-revolution or operate improperly. As shown in Figs. 3 and 4, the plungers 85 are provided with rack-teeth and are connected by a pinion 86, secured to a short vertical shaft 87, so that as one plunger is retracted to disengage a cam 84 and allow the clutch to engage the rotating clutch member 82 the other plunger is advanced into the path of the other cam 84, so that as the clutch completes a half-revolution the cam 84 acts against the abutment 85 to disengage the clutch from the rotating clutch member 82. The gear 75 is held in position after each half-revolution by a spring-operated pin 75ª, having a V-shaped end arranged to engage notches in the hub of the gear, Fig. 5. The clutch member 82 is secured to a shaft 82ª, which extends into the gear-case 67, Figs. 1 and 15, and is constantly driven from the sleeve 71 through gears 71ª.

Whenever the cutter-slide is fed forward, the cutter should be in cutting relation, and whenever the movement of the cutter-slide is in the direction of the return the cutter should be out of cutting relation. To insure this and to avoid any possibility of getting the mechanism for raising and lowering the cutter-carriage out of time with the movements of the cutter-slide, the plungers 85, the movement of which determines the raising and lowering of the cutter-carriage, are controlled by the movement of the clutch 4, which connects either the feed or return mechanism with the cutter-slide. The connection between the clutch 4 and the plungers 85 consists of a segment 89, formed on an arm projecting rearwardly from the lever 20 and engaging a pinion 90, secured to the shaft 87. With this connection between the clutch 4 and the plungers 85 the movement of the clutch 4 from one of the gears 5 and 6 to the other will result in withdrawing one of the plungers 85 from engagement with a cam 84 and the advance of the other plunger into the path of the other cam 84, and consequently will result in an operation of the mechanism for raising and lowering the cutter-carriage. The movement of the clutch 4 into mid-position will not, however, result in sufficient movement of the plunger 85 to disengage it from the cam 84, and consequently if the clutch is moved into mid-position and is afterward returned into engagement with the same gear from which it was disengaged there will be no operation of the mechanism for raising and lowering the cutter-carriage. If, however, the clutch 4 is moved into mid-position and is subsequently moved into engagement with the other gear—that is, the one from which it was not disengaged—then the plunger 85 will be operated to cause a half-revolution of the gear 75 to raise or lower the cutter-carriage. Whenever, therefore, the clutch 4 is operated to reverse the previous movement of the cutter-carriage, the mechanism for raising and lowering the cutter-carriage is operated, and is operated at such time only. There is no possibility, therefore, for the mechanism for moving the cutter-slide and the mechanism for raising and lowering the cutter-carriage to get out of time or any possibility for the cutter to be in cutting relation during the return movement of the cutter-slide.

The work is supported by a rotary spindle 91, mounted in an adjustable work-carrying slide 92, which is guided and supported between two uprights or columns 93, Figs. 2, 13, and 14. Each of the two uprights are provided with oppositely-inclined ways 94, and the slide 92 and the slide-plate 95, which is secured thereto, are provided with correspondingly-beveled flanges to engage the ways 94. The opposing faces of the uprights 93 are also provided with guiding-surfaces 96, which engage corresponding surfaces on the opposite sides of the slide 92. The work-slide may be adjusted vertically by means of a nut 97, mounted in the frame of the machine and engaging a screw-rod 98, depending from the slide. The nut 97 may be turned to raise or lower the slide 92 by means of a manually-operated shaft 99, connected with the nut 97 through the bevel-gears 100. The slide 92 is held in its adjusted position by clamping-bolts 101, which extend through the work-slide and through the work-slide plate just inside the inner faces of the uprights 93. There are four of these clamping-bolts, and by tightening the nuts on the bolts the slide 92 is firmly secured in position. The work-slide and the work-slide plate are so fitted to the ways and bearing-surfaces on the uprights that when the nuts on the clamping-bolts are loosened there is a close sliding fit between the parts. When the nuts are tightened on the clamping-bolts, there is sufficient spring in the work-slide plate at the points where the binding-bolts bear against the plate to allow the flanges on the plate to be forced against the ways on the uprights at these points. By reason of the beveled or inclined ways on the uprights the pressure exerted on the ways by the tightening of the nuts on the clamping-bolts tends to draw the uprights toward each other, thereby pressing the bearing-surfaces 96 firmly against the sides of the work-slide. The tightening of the clamping-bolts therefore binds the work-slide, work-slide plate, and uprights firmly together, so that the work-slide is rigidly and securely held against the thrust exerted by the cutter in whatever direction the thrust may be. Moreover, by reason of the construction and arrangement of the ways and also by reason of the close sliding fit between the uprights and the work-carrying slide the binding of the parts together by the clamping-bolts has no tendency to throw the work-spindle out of alinement.

The work-spindle is rotated during the action of the cutter and also to index the work through a worm-wheel 102, secured to the rear end of the spindle and engaged by a worm 103, mounted in a bracket projecting from the work-slide plate. The shaft 104, on which the worm 103 is mounted, is connected by gears 105 with a vertical shaft 106, Figs. 1 and 2, to which one of the gears 105 is connected by a key and keyway, so that the gear may rotate with the shaft and still be free to slide on the shaft when the work-carrying slide is adjusted. The shaft 106 is driven during the reciprocation of the cutter-slide through a shaft 107 in line therewith and connected to the shaft 106 by bevel-gears 108, carried by a frame 109 and engaging bevel-gears 110 and 111 on the ends of shafts 106 and 107, respectively. The shaft 107 is rotated during the reciprocation of the cutter-slide by a train of gearing connecting the shaft 107 with the feed-screw 3. This system of gearing includes a series of change-gears 112, Fig. 2, by which the ratio between the movement of the cutter-slide and the rotation of the work-spindle may be varied for spirals of different lead, and also includes reversing-gears 113 and 114 for changing the direction of rotation of the work during the cutting, so that either right or left hand spirals may be cut. The reversing-gears 113 and 114 are mounted on studs 115, carried by a frame consisting of two arms 116 and 117, Figs. 11 and 12. The arm 117 is pivoted on a bearing 118, formed on the end of the frame, and the arm 116 is pivoted on a concentric bearing 119, formed on the inner side of a bracket 120, projecting from the end of the frame. The gears 113 and 114 are mounted on the studs 115 between the arms 116 and 117, and thus the studs 115 are supported at both sides of the gear. This manner of mounting the reversing-gears gives a rigid construction and one which prevents any cramping of the gears. The gears 113 and 114 are so arranged that either gear may be brought into engagement with the gear 121, secured to the end of the feed-screw 3, by swinging the arms 116 and 117 about their bearings. These arms may be adjusted to bring either gear into engagement with the gear 121 by means of a projection 122 on the arm 116, and the arms may be secured in adjusted position by means of a clamping-bolt 123, extending through a slotted arm 124 and engaging the projection 122. Motion is transmitted from the gear 113 to the change-gearing 112 through the shaft 125, Fig. 11, mounted concentric with the bearings 118 and 119 and carrying a gear 126, with which the gear 113 is in constant engagement, and also carrying a gear 127, forming one of the system of change-gears. When the gear 113 is in engagement with the gear 121 on the end of the lead-screw 3, it acts to transmit motion from the screw 3 directly to the shaft 125; but when gear 114 is in engagement with the gear 121 the motion of the screw 3 is transmitted, through the gear 114, to gear 113, thus reversing the direction of the rotation of the shaft 125. The system of change-gearing is connected with the shaft 107 through the shaft 128, which carries a gear 129, engaging one of the change-gears, and a bevel 130, engaging a similar gear 131, secured to the shaft 107.

During the reciprocation of the cutter-slide the frame 109 remains stationary, except during the time that the indexing of the blank spindle is taking place. When the indexing is to take place, the frame 109 is rotated through a worm-wheel 132, formed on the frame and engaged by a worm on a shaft 133. The shaft 133 is connected, through a system of suitable gearing 134, with a shaft 135, which is connected with the indexing mechanism. The indexing mechanism is contained within a casing 136 and is operated at the proper time by a constantly-running shaft 137. This shaft is driven from the driving-shaft 12 through gearing 138, which connects the shaft 137 with the shaft 139, to which the gear 14, previously referred to, is secured. The indexing mechanism is thrown into operation by the depression of a trip 140, projecting above the top of the indexing-casing 136. This trip is operated by a dog 141, carried on the reversing-bar 23 and so constructed that when the bar is moved forward by the advance movement of the cutter-slide it will ride over the trip 140 without depressing the same; but when the reversing-bar is moved rearwardly at the end of the return movement of the cutter-slide it will depress the trip and throw the indexing mechanism into operation.

As has been before stated, the cutter-spindle 1, Fig. 8, is rotated through the gear 55, mounted in a bearing 56, formed on the head 50. The gear 55 is formed on a sleeve 142, which fits the bearing 56 and is held from longitudinal movement in the bearing by a nut 143, screwed onto the end of the sleeve. The spindle 1 extends through the sleeve 142 and is connected therewith through an interposed sleeve 144. The sleeve 144 is connected with the sleeve 142 of the gear by a key-and-slot connection, which causes the sleeves to rotate together, but does not ininterfere with a relative longitudinal movement between the sleeves. The sleeve 144 is connected with the spindle 1 through a similar key-and-slot connection. With this form of connection between the spindle and gear 55 the thrust exerted on the gear by reason of its engagement with the driving-gear 54 is resisted entirely by the bearing 56 and is not transmitted to the spindle. Any longitudinal movement of the gear 55 due to wear or looseness in the bearing will not, therefore, effect the spindle or tend to move the cutter out of proper position. The sleeve 144 not only acts as a connection between the spindle and gear 55, but also serves as a means for clamping the cutter in position on the spindle. The spindle is provided with an integral collar 145, between which and the end of the sleeve 144 the cutter is clamped. In case the hub of the cutter is not of sufficient width to fill the space between the end of the sleeve 144 and the collar 145 a series of washers or collars 146 may be interposed between the cutter and the collar 145 and between the cutter and the end of the sleeve 144. The sleeve 144 is forced longitudinally of the spindle to clamp the cutter in position by means of a nut 147, screwed onto the end of the spindle. Beyond the collar 145 the spindle fits and turns within a bearing-sleeve 148, mounted within a bearing 149 in the head 50 and provided with a flange 150, which engages the end of the bearing. The spindle is held from longitudinal movement by the collar 145, which engages one end of the bearing-sleeve 148, and a collar 151, which is held in engagement with the other end of the bearing-sleeve by a nut 152. The bearing-sleeve 148 is held firmly in position by the clamping action of the bearing 149, which is so constructed that it may be firmly forced against the bearing-sleeve. The collar 145 and the bearing-sleeve 148 are of substantially the same diameter, and the spindle may be removed from the head 50 by releasing the bearing 148 and withdrawing it and the spindle together, the nut 147 having been removed to allow the spindle to be withdrawn from the cutter.

In Figs. 16 and 17 a modified construction of the mechanism for controlling the cutter raising and lowering clutch is shown. In this construction the clutch 81 is provided with a single cam 84, which coöperates with two plungers 85, arranged on diametrically opposite sides of the clutch. The plungers 85 are connected by means of the pinions 153 and the rack-bar 154, so that as one plunger is advanced the other is retracted. With the parts in the position shown in Fig. 16 the plunger 85 at the right is in engagement with the cam 84 and holds the clutch 81 out of engagement with the clutch member 82. As this plunger 85 is withdrawn from engagement with the cam 84 the plunger 85 at the left is advanced into the path of the cam 84, so that the clutch 81 will be thrown out of engagement with the clutch member 82 after the clutch has made a half-revolution. In other words, the operation of one of the plungers 85 to release the clutch sets the other plunger to disengage the clutch after it has made a half-revolution. In Figs. 18 and 19 is shown a modified form of gearing parts of which may be mounted on the cutter-slide and cutter-carriage, respectively, and permit of the vertical movement of the cutter-carriage in throwing the cutter into and out of cutting relation without interfering with the proper driving of the cutter. In this construction the swivel-head 50', on which the cutter-spindle is mounted, is provided with a cylindrical projection 51', which fits within a bearing in the upper side of the carriage 40' and holds and guides the swivel-head in its adjustments. The bevel-gear 54' corresponds to the bevel-gear 54, already described, and is mounted upon a cylindrical bearing 50ª, formed on the swivel-head concentric with the projection 51'. The bevel-gear 54' is provided with a cylindrical hub 54ª, upon which is mounted a sleeve 57ª, provided with projecting ears 57ᵇ, arranged to engage opposite sides of lugs 54ᵇ, depending from the gear 54'. These ears and lugs form a sliding connection between the sleeve 57ª and the gear 54', which causes these parts to revolve together, while allowing the gear 54' to have a vertical movement relative to the sleeve 57ª. A spiral or worm gear 57' is secured to the sleeve 57ª, and the sleeve and gear are held from vertical movement by an annular plate 57ᶜ. The worm-gear is engaged and driven to rotate the bevel-gear 54' by a spiral or worm pinion 58', Fig. 19, secured to a shaft 59', mounted in suitable bearings in the slide 2' and projecting beyond the side of the slide. A spiral or worm gear 61' is secured to the projecting end of the shaft 59' and is engaged and driven by a spiral or worm gear 62', keyed to rotate with the shaft 60', while being free to slide longitudinally thereon as the slide 2' is reciprocated. This mechanism above described gives a powerful and steady drive to the cutter-spindle, so that the cutter will act uniformly and without chatter when making heavy cuts under a comparatively rapid feed. This is the form of drive which I prefer to employ, and it embodies certain features of invention which will be pointed out in the claims. In this modification just described, as well as in the construction shown in Figs. 3 and 4, it will be seen that the clutch 81, which operates the mechanism for throwing the blank and cutter into and out of cutting relation, is thrown into and out of operation by coöperating rotary and non-rotary members and that whenever a non-rotary member is withdrawn from engagement with a rotary member a non-rotary member is simultaneously moved into the path of a rotary member, so that the act of throwing the clutch into operation sets the devices for throwing the clutch out of operation.

What I claim as my invention, and desire to secure by Letters Patent, is—

1. The combination of a rotary blank-support, a reciprocating cutter-slide, a cutter-carriage mounted in guides in said slide arranged at right angles to the line of movement of the slide, and eccentrics at each end of the carriage for moving the carriage in the guides, substantially as described.

2. The combination of a reciprocating cutter-slide, a cutter-carriage mounted thereon, a cutter-spindle mounted in the carriage, a gear mounted in the carriage to move therewith and connected to drive the spindle, a rotary driving member mounted on the slide, intermediate sliding connections between the driving member and gear, and mechanism for moving the carriage on the slide to throw the cutter into and out of cutting relation, substantially as described.

3. The combination of a reciprocating cutter-slide, a cutter-carriage mounted thereon, a cutter-spindle mounted on the carriage, a shaft extending in the direction of movement of the slide and mounted in fixed bearings, a gear having a sliding connection with the shaft and connected to move with the slide, a gear mounted on the cutter-carriage and connected to drive the spindle, intermediate sliding connections between said gears, and mechanism for moving the carriage on the slide to throw the cutter into and out of cutting relation, substantially as described.

4. The combination with a spindle, of a swivel-head on which the spindle is mounted, a carriage on which the swivel-head is mounted, guides for the carriage parallel to the axis of the swivel-head, a gear on the carriage concentric with the swivel-head and connected to drive the spindle, a second concentric gear having a sliding connection, and mechanism for moving the carriage in the guides, substantially as described.

5. The combination of a reciprocating cutter-slide, a cutter-carriage mounted thereon, a spiral or worm gear mounted on the slide, a gear engaged and driven therefrom, a gear on the carriage connected to drive the spindle and having a sliding connection with said driven gear, and mechanism for moving the carriage on the slide to throw the cutter into and out of cutting relation, substantially as described.

6. The combination of a swivel-head carrying the cutter-spindle, a concentric on the head connected to drive the spindle, a spiral or worm gear held from movement with said head, sliding connections between said gears, a spiral or worm gear engaging and driving said spiral or worm gear, and means for raising and lowering the head, substantially as described.

7. The combination of a reciprocating slide, a carriage movable thereon, a swivel-head on the carriage, a spindle on the head, a gear concentric with the axis of the head connected to drive the spindle, a spiral or worm gear on the slide, a sliding connection between said gears, a gear engaging and driving the gear on the slide, and means for moving the carriage on the slide, substantially as described.

8. A machine for cutting spirals having in combination a reciprocating slide, a cutter-carriage mounted thereon, a swivel-head mounted on the carriage, a cutter-spindle on the head, a shaft extending in the direction of movement of the slide and mounted in fixed bearings, a gear having a sliding connection with the shaft and connected to move with the slide, a gear mounted on the carriage concentric with the head and connected to drive the spindle, intermediate sliding connections between the gears, and mechanism for moving the carriage on the slide to throw the cutter into and out of cutting relation, substantially as described.

9. A machine for cutting spirals having in combination a blank-support, a cutter-carriage, mechanism for reciprocating one of said parts parallel to the axis of the blank-support, mechanism for reciprocating the blank during the cutting whereby a spiral cut is made, guides for the cutter-carriage arranged to guide the carriage in a direction at right angles to the axis of the blank-support, an eccentric at each end of the carriage for moving it in the guides, substantially as described.

10. A machine for cutting spirals having in combination a blank-support, a cutter-carriage, mechanism for reciprocating one of said parts parallel to the axis of the blank-support, mechanism for rotating the blank during the cutting whereby a spiral cut is made, guides for the cutter-carriage arranged to guide the carriage in a direction at right angles to the axis of the blank-support, an eccentric at each corner of the carriage for moving it in the guides, substantially as described.

11. The combination with a cutter-slide, of guides therein, a cutter-carriage mounted in said guides, and four eccentrics for moving the carriage in the guides, substantially as described.

12. The combination with a cutter-slide, of a cutter-carriage guided in said slide, eccentric blocks sliding in said carriage, and eccentrics for operating said blocks to raise and lower the carriage, substantially as described.

13. A machine for cutting spirals having in combination a rotary blank-support, a cutter-support, a feed mechanism for one of said supports, a return mechanism for said support, a device for connecting said mechanisms with the reciprocating support, mechanism for throwing the blank and cutter into and out of cutting relation so controlled by said device that the operation of said device in connecting either the feed or return mechanism with the reciprocating support to reverse its previous movement results in the operation of the mechanism for throwing the blank and cutter into and out of cutting relation, substantially as described.

14. A machine for cutting spirals having in combination a rotary blank-support, a cutter-slide, a feed mechanism, a return mechanism, a device for connecting said mechanisms with the slide, mechanism controlled by said device to throw the blank and cutter into cutting relation when the feed mechanism is connected with the slide and to throw the blank and cutter out of cutting relation when the return mechanism is connected with the slide, substantially as described.

15. A machine for cutting spirals having in combination a rotary blank-support, a cutter-support, a feed mechanism, a return mechanism, a clutch for throwing said mechanisms into operation, mechanism controlled through the movement of said clutch for throwing the blank and cutter into and out of cutting relation, substantially as described.

16. A machine for cutting spirals having in combination a blank-support, a cutter-slide, a feed mechanism, a return mechanism, a clutch for connecting said mechanisms with the slide, mechanism controlled through the movement of said clutch for throwing the blank and cutter into and out of cutting relation, substantially as described.

17. A machine for cutting spirals having in combination a blank-support, a cutter-slide, a feed mechanism, a return mechanism, a reversing-clutch for connecting said mechanisms with the slide, mechanism for throwing the blank and cutter into and out of cutting relation, a clutch for operating said mechanism controlled from the reversing-clutch, substantially as described.

18. A machine for cutting spirals having in combination a cutter-slide, a feed mechanism, a return mechanism, a reversing-clutch for connecting said mechanisms with the slide, mechanism controlled through the movement of the clutch for moving the cutter into and out of cutting relation, substantially as described.

19. A machine for cutting spirals having in combination a cutter-slide, a feed mechanism, a return mechanism, a device for connecting said mechanisms with the slide, mechanism controlled by said device to move the cutter into cutting relation whenever the feed mechanism is connected with the slide, and to move the cutter out of cutting relation whenever the return mechanism is connected with the slide, substantially as described.

20. A machine for cutting spirals having in combination, a cutter-slide, a feed mechanism, a return mechanism, a reversing-clutch for connecting said mechanisms with the slide, mechanism for moving the cutter into and out of cutting relation, a clutch for operating said mechanism controlled from the reversing-clutch, substantially as described.

21. A machine for cutting spirals having in combination, a rotary blank-support, a cutter-support, mechanism for feeding one of said supports parallel to the axis of the blank-support, mechanism for returning said support, a device for connecting one or the other of said mechanisms with the reciprocating support, and mechanism for throwing the blank and cutter out of cutting relation set in motion by the operation of said device in connecting the reciprocating support with the return mechanism to reverse its previous movement, substantially as described.

22. A machine for cutting spirals having in combination a rotary blank-support, a cutter-slide, a feed mechanism, a return mechanism, a device for connecting the return mechanism with the slide, and mechanism controlled by said device for throwing the blank and cutter out of cutting relation whenever the return mechanism is connected with the slide to reverse its previous movement, substantially as described.

23. A machine for cutting spirals having in combination a rotary blank-support, a cutter-slide, a feed mechanism, a return mechanism, a clutch for connecting said return mechanism with the slide, and mechanism for throwing the blank and cutter out of cutting relation thrown into operation through the operation of the clutch in connecting the return mechanism with the slide to reverse its previous movement, substantially as described.

24. A machine for cutting spirals having in combination a cutter-slide, a feed mechanism, a return mechanism, a clutch for connecting said return mechanism with the slide, and mechanism for moving the cutter out of cutting relation thrown into operation through the operation of the clutch in connecting the return mechanism with the slide to reverse its previous movement, substantially as described.

25. A machine for cutting spirals having in combination a cutter-slide, mechanism for reciprocating the same including a reversing-clutch, mechanism for throwing the blank and cutter into and out of cutting relation, a clutch for operating the same, connections between said clutches whereby the shifting of the reversing-clutch throws the other clutch into operation, substantially as described.

26. A machine for cutting spirals having in combination a cutter-slide, mechanism for reciprocating the same including a reversing-clutch, mechanism for moving the cutter into and out of cutting relation, a clutch for operating the same, and connections between said clutches whereby the shifting of the reversing-clutch throws the other clutch into operation, substantially as described.

RICHARD T. WINGO.

Witnesses:
W. H. THURSTON,
J. H. THURSTON.